US012585522B2

(12) United States Patent
Neff et al.

(10) Patent No.: US 12,585,522 B2
(45) Date of Patent: Mar. 24, 2026

(54) SYSTEMS AND METHODS FOR COHERENT DATA TRANSFER WITH SYNC IN A MULTIPLE CORE PROCESSOR

(71) Applicant: Woodward, Inc., Fort Collins, CO (US)

(72) Inventors: William P. Neff, Wellington, CO (US); Bryan R. Haack, Fort Collins, CO (US); Timothy W. McDonald, Timnath, CO (US); Todd L. Marcusen, Windsor, CO (US)

(73) Assignee: Woodward, Inc.

( * ) Notice: Subject to any disclaimer, the term of this patent is extended or adjusted under 35 U.S.C. 154(b) by 0 days.

(21) Appl. No.: 18/582,166

(22) Filed: Feb. 20, 2024

(65) Prior Publication Data

US 2025/0265138 A1     Aug. 21, 2025

(51) Int. Cl.
    *G06F 11/00*    (2006.01)
    *G06F 11/07*    (2006.01)

(52) U.S. Cl.
    CPC ........ *G06F 11/0772* (2013.01); *G06F 11/073* (2013.01)

(58) Field of Classification Search
None
See application file for complete search history.

(56) References Cited

U.S. PATENT DOCUMENTS

| | | | |
|---|---|---|---|
| 6,253,293 B1 * | 6/2001 | Rao | G10L 19/16 |
| | | | 711/149 |
| 10,331,128 B1 * | 6/2019 | Hansel | H04L 9/30 |
| 2008/0086617 A1 * | 4/2008 | Kasahara | G06F 15/167 |
| | | | 711/167 |
| 2021/0049057 A1 | 2/2021 | Iida et al. | |
| 2021/0208622 A1 * | 7/2021 | Bamford | G06F 1/12 |

FOREIGN PATENT DOCUMENTS

WO    2021183892 A1    9/2021

OTHER PUBLICATIONS

Google Scholar/Patents search—text refined (Year: 2025).*
Int'l Search Report and Written Opinion Appln No. PCT/US2025/011867 mailed May 19, 2025.

* cited by examiner

*Primary Examiner* — Christopher S McCarthy
(74) *Attorney, Agent, or Firm* — MCANDREWS HELD & MALLOY, LTD

(57) ABSTRACT

Methods and systems for a digital signal processor (DSP) to transmit data between a first central processing unit (CPU) core (a producing core) and a second CPU core (a consuming core). The first and second CPU cores are time-aligned, such that cycles of one or more frames of the first CPU core correlate to one or more cycles of the second CPU core. The first and second CPU cores are configured to access a shared memory, through which data can be written and/or read by the first and second CPU cores.

15 Claims, 3 Drawing Sheets

SYSTEMS AND METHODS FOR COHERENT DATA TRANSFER WITH SYNC IN A MULTIPLE CORE PROCESSOR

PRIORITY CLAIM/INCORPORATION BY REFERENCE

N/A

FIELD

Certain embodiments of the disclosure relate to control systems. More specifically, certain embodiments of the disclosure relate to data transfer between a producing central processing unit (CPU) or core, and a consuming CPU in a manner to mitigate data collision during a data transfer operation.

BACKGROUND

Existing control systems are employed to activate a variety of devices, such as motors controlling a position of a hinged enclosure (e.g., a door or cowl for a vehicle, such as an aircraft). The control system can be implemented by transmitting instructions between CPUs that generate the instructions and CPUs to control the devices, for example. However, signal transfer can be disrupted if multiple CPUs attempt to write to a common memory. Thus, a system that mitigates signal disruption is desirable.

Further limitations and disadvantages of conventional and traditional approaches will become apparent to one of skill in the art, through comparison of such systems with the present disclosure as set forth in the remainder of the present application with reference to the drawings.

BRIEF SUMMARY

Systems and/or methods are provided for an example digital signal processor (DSP) to transmit data between cores of a multi-core processor. More specifically, disclosed examples relate to a DSP configured to synchronize data transfer between cores employing a shared memory.

These and various other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

The figures are not necessarily to scale. Where appropriate, similar or identical reference numbers are used to refer to similar or identical components.

DETAILED DESCRIPTION

Figure 1:
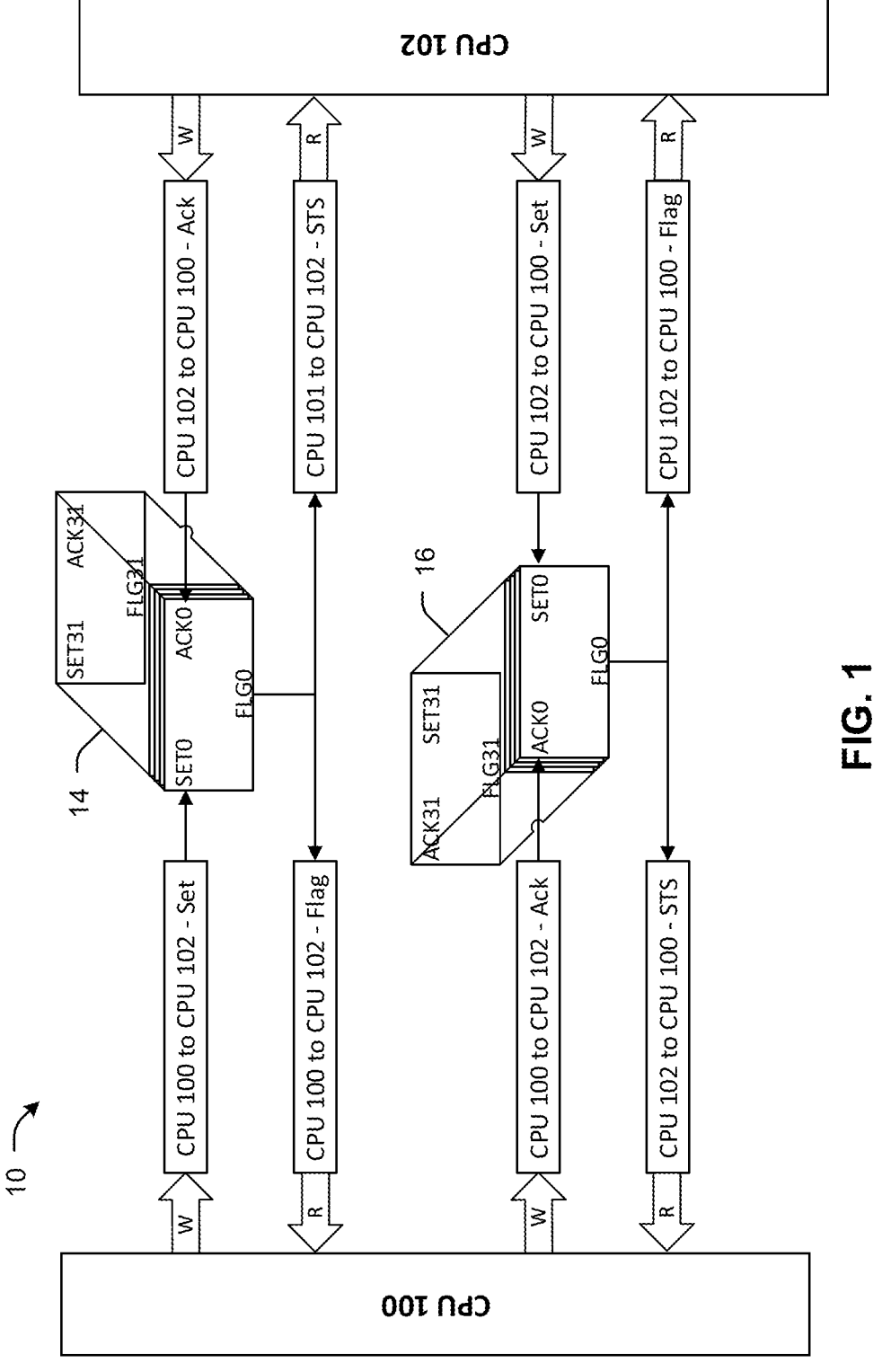
FIG. 1 illustrates an example process diagram for a digital signal processor (DSP) employing multiple central processing units (CPU), in accordance with an example embodiment of the disclosure.

Disclosed are example systems and methods for a digital signal processor (DSP) to transmit data between a first central processing unit (CPU) core (a producing core) and a second CPU core (a consuming core). The first and second CPU cores are time-aligned, such that cycles of one or more frames of the first CPU core correlate to one or more cycles of the second CPU core. The first and second CPU cores are configured to access a shared memory, through which data can be written and/or read by the first and second CPU cores.

For example, coherent data transfer with a synchronizing function provides a lightweight solution to supply data between first and second CPU cores of the DSP using the shared memory. As a result, the process prevents data from being manipulated (e.g., overwritten, modified, etc.) while being transferred and/or simultaneously consumed. Due to access restrictions for each processor, memory access collisions are avoided between producing and/or consuming processors (e.g., central processing units (CPUs)). In response to communication protocols, acknowledgment (ACK) and/or negative acknowledgment (NACK) of data can be detected. Furthermore, the process provides that each CPU core is configured to verify that every other processor is and remains in sync with the others.

Multi-core solutions often require communication between the various processing cores. The disclosed systems and methods are directed to inter-process communication (IPC), where two or more CPUs are configured to communicate with each other through synchronized actions. The communication between CPUs can be implemented via one or more shared memory devices, which may include partitioned regions within.

In some disclosed examples, the processors include at least a producing CPU and a consuming CPU. The producing CPU receives commands and generates instructions, by way of a data signal, which are written to the shared memory for the consuming CPU to read. The shared memory location acts as a buffer where the written instructions from the producing CPU are stored and from where the consuming CPU accesses and reads the data.

In an example multi-core processor employing two cores (e.g., a first CPU, CPU1, and a second CPU, CPU2), each core may have different responsibilities and/or functions on the digital signal processor (DSP). For example, the first CPU can be configured to carry out one or more of serial communications, fault detection, and/or logging events. In this example, the second CPU can be configured to carry out all external commands (e.g., motor control functions, system activation, etc.).

Due to the different responsibilities, the first CPU can operate at a first frame rate and the second CPU can operate at a second frame rate, with the first frame rate being slower (e.g., 5 KHz) than the second, faster frame rate (e.g., 20 KHz), resulting in a 4:1 frame rate ratio. Although some examples are provided with specific frame rates or frame rate ratios, the frame rates and the resulting ratios can vary, depending on specific application, desired response time, number of CPU cores employed, or other factors. For example, a 2:1 ratio rate (e.g., 5 KHz to 10 KHz) could be employed for less time-sensitive operations, or an 8:1 ratio rate (e.g., 5 KHz to 40 KHz) can be used for a more responsive operation. Faster rates may require greater power and/or computing resources, and therefore different frame rates may be selected for different applications depending on specific requirements thereof.

In an example data operation, the first, producing CPU communicates motor commands and motor control parameters (e.g., from a user interface, electronic control, computing platform, etc.) to the second, consuming CPU. The second CPU then communicates feedback data to the first CPU for performance assessment of the system.

To ensure proper operation, data coherency is used for processor-to-processor communications. For example, if the second CPU starts to process or execute a new command (e.g., motor control loop parameters) before the first CPU has finished altering the command, the motor could be commutated in an undesirable, incorrect, and/or damaging way. Similarly, when assessing motor performance (e.g., from feedback provided by the second CPU), the first CPU must access data from the second CPU that is coherent. If the data is not coherent, the first CPU may yield an incorrect determination—e.g., return a false determination that a fully operational system is not operating correctly, or falsely determine that the faulty system is operating correctly.

Advantageously, the disclosed multi-core system employing coherent data transfer with a sync solution allows for quick data transfer and consumption, without memory address collisions between the communicating cores.

This is achieved despite each core running at different frame rates, and while maintaining coherent data. In some examples, data from the first producing CPU is provided to a first shared memory. Once the write operation is complete, an indication (e.g., via a flag or other signal) is provided to the second consumer CPU, which proceeds to read the data. In some examples, certain memory locations only allow write access from certain CPUs (e.g. the first, producing CPU, which may have both read and write access), whereas certain other CPUs (e.g. the second consumer CPU, which may have both read and write access) are only given read access (e.g., at all times, at specific times, and/or in response to a permission indication).

Further, feedback from the second CPU is only provided to the first CPU following an indication that the feedback signal is completely received at the shared memory. Access is enabled by the flag or other indicator from the opposite CPU providing an address on the shared memory for the written data/instructions, allowing the receiving CPU to point to the written data/instructions.

The disclosed systems and methods offer many advantages over conventional systems. For example, the disclosed systems and methods avoid data collisions by writing flags to an address of a shared memory to both indicate to an opposite CPU core that data is available, as well as ensure the address is not in use. In some examples, a cycle of a major and/or minor frame of a producing CPU core can be aligned with one or more consuming frames of a consumer CPU core. In some disclosed examples, both flags and timing are used to provide redundant techniques to ensure data collisions are mitigated.

In some examples, flags can be provided between opposing CPU cores to orient the other CPU core as to the availability and/or address of data, without aligning the cycles of the communicating CPU cores. For example, activation or setting of a flag can indicate a presence of new data (and/or consumption of that data) by a given CPU at a portion of a shared memory. Further, acknowledgement of a read and/or write operation (e.g., by an opposing CPU) can trigger activation of the flag (e.g., "raising" the flag by a write operation, and "lowering" the flag following a read operation.).

In some examples, the CPU cores can be aligned without the additional use of flags. For instance, as a frame begins and/or ends, the corresponding CPU core can query the shared memory, and may not require an affirmative acknowledgement of a flag to continue with a read and/or write operation.

To optimize the use of a shared memory (e.g., a shared memory with multiple IPC registers and/or shared regions), as well as ensure responsive communication between CPU cores, the use of flags and other communications (e.g., ACK, NACK) between CPU cores along with timing/cycle alignment of the various CPU cores are described with reference to the various figures.

As utilized herein, "and/or" means any one or more of the items in the list joined by "and/or". For example, "x and/or y" means any element of the three-element set $\{(x), (y), (x, y)\}$. Similarly, "x, y, and/or z" means any element of the seven-element set $\{(x), (y), (z), (x, y), (x, z), (y, z), (x, y, z)\}$. As utilized herein, the term "module" refers to functions that can be implemented in hardware, software, firmware, or any combination of one or more thereof. As utilized herein, the term "exemplary" means serving as a non-limiting example, instance, or illustration.

As utilized herein, the terms "first" and "second" may be used to enumerate different components or elements of the same type, and do not necessarily imply any particular order. For example, while in some examples a first time occurs prior to a second time within a time period, the terms "first time" and "second time" do not imply any specific order in which the first or second times occur relative to the other within the time period.

As utilized herein, a "circuit," or "circuitry," includes any analog and/or digital components, power and/or control elements, such as a microprocessor, digital signal processor (DSP), software, and the like, discrete and/or integrated components, or portions and/or combinations thereof.

As utilized herein, the terms "control circuit," "control circuitry," and/or "controller," may include digital and/or analog circuitry, discrete and/or integrated circuitry, processors, microprocessors, digital signal processors (DSPs), and/or other logic circuitry, and/or associated software, hardware, and/or firmware. Control circuits or control circuitry may be located on one or more circuit boards that form part or all of a controller.

As utilized herein, the term "memory" includes volatile and non-volatile memory devices and/or other storage device.

As utilized herein, the term "multi-core processor" includes a microprocessor arranged on a single integrated circuit (IC) having two or more separate processing units (e.g., cores or CPU cores), each of which is configured to write, read and/or execute instructions from other processing units.

As utilized herein, the term "digital signal processor (DSP)" includes a microprocessor chip with a specialized architecture designed for optimal digital signal processing.

As utilized herein, the term "data coherence" provides uniformity across shared resource data, as well as logical connections and completeness within a single data set and across data sets.

FIG. 1 illustrates an example DSP offering a unique register set for inter-processor communications (IPC). Among other features, these registers provide the means for each CPU core to implement one or more of the following: 1) pass a shared memory address housing new data to another CPU; 2) notify the other CPU of the presence of new data in that shared memory; and/or 3) acknowledge presence and/or transfer of data from each CPU.

The disclosed DSP has random-access memory (RAM) that can be separated into various physical and/or logical sections. During a data transfer operation, address collisions are mitigated by configuring each CPU core to access regions of the shared memory that are different from those accessible to another CPU core (e.g., at a given time, at a given address, etc.).

Thus, FIG. 1 illustrates an example process diagram of a multi-core processor 10 configured for communications between a first CPU 100 and a second CPU 102. One or more shared memory devices 14 and 16 are provided, accessible to one or both of the first CPU 110 and the second CPU 102.

In order for successful data transfer between the first and second CPUs while avoiding data collisions, the first and second CPUs are configured to agree on the structure of the data being transferred. Further, the first and second CPUs are initialized such that a buffer or memory (e.g., shared memory 14, 16) from which a consuming CPU (e.g., the second CPU 102) is reading is not the same buffer to which a producing CPU (e.g., the first CPU 100) is writing. Thus, the producing CPU can be writing to a buffer at a first time, and the consuming CPU reads at a second time, the timing of which is based on the transmission and receipt of flags from the opposing CPU that a write/read operation is complete. In some examples, the producing CPU writes to a first buffer, and the consuming CPU reads from a second buffer, which can be done simultaneously and/or in response to a flag.

Based on this common picture, the producing first CPU will know the type(s) and/or size of the data being transmitted, while the consuming CPU will know the type(s) and/or size of the data being received.

Although in several examples, the first CPU 100 is described as performing the functions of a producing CPU and the second CPU 102 is described as performing the functions of a consuming CPU, either CPU and/or additional CPUs and/or cores can be configured to operate as either a producing CPU and/or a consuming CPU, depending on a particular application or desired outcome.

As shown, each CPU is configured to read and/or write data to and/or from the shared memory 14, 16, and/or another CPU. For example, the first CPU 100 writes data to the first shared memory 14 (e.g., set), which provides status information to second CPU 102 (e.g., STS), indicating the data writing operation is complete. Once read, the second CPU 102 then writes an acknowledgement to the first shared memory 14 (e.g., ACK). In some examples, writing of the acknowledgement from the second CPU serves to clear an existing flag generated with the status indication from the opposing CPU at the shared memory. In some additional or alternative examples, writing of the acknowledgement triggers a flag transmission to the first CPU 100 (e.g., flag) and/or shared memory with the feedback.

Once the information is read and acknowledged, the second CPU 102 can be configured to execute the instructions written by the first CPU 100. Upon completion, the second CPU 102 is similarly configured to write data to the second shared memory 16 (e.g., set), which provides status information to the first CPU 100 (e.g., STS), indicating that the instructions have been successfully executed (or that a fault has occurred). The first CPU 100 then reads the status information and writes an acknowledgement to the second shared memory 16 (e.g., ACK). In some examples, writing of the acknowledgement from the first CPU serves to clear an existing flag generated with the status indication from the opposing CPU at the shared memory. In some additional or alternative examples, writing of the acknowledgement triggers a flag transmission to the second CPU 102 (e.g., flag). This process is described in greater detail with reference to FIGS. 2 and 3.

Figure 2:
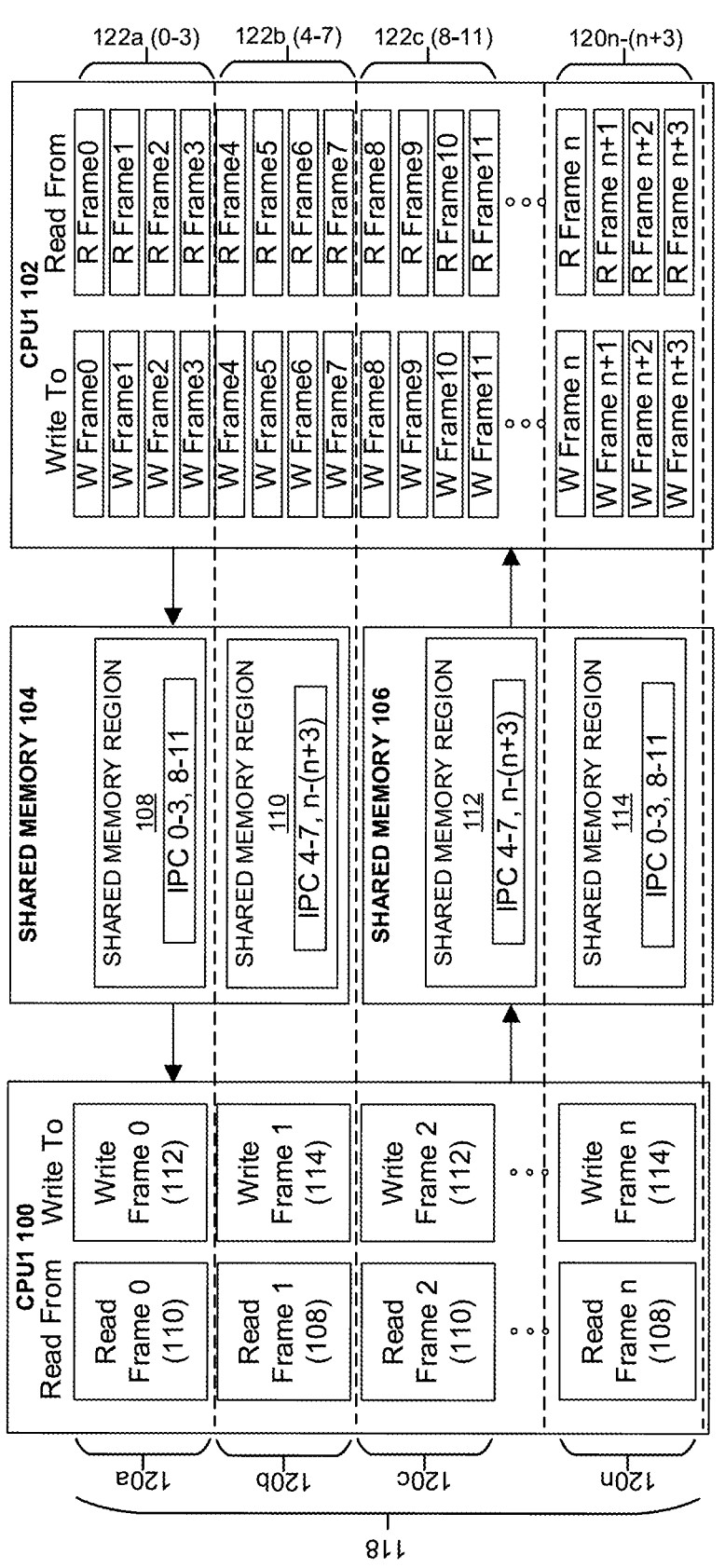
FIG. 2 illustrates an example process diagram for a DSP employing multiple CPUs and a shared memory, in accordance with an example embodiment of the disclosure.

FIG. 2 illustrates a detailed graphical representation of an example system, such as the multi-core processor 10 provided in FIG. 1. As shown in FIG. 2, the disclosed system employs a first shared memory 104 and a second shared memory 106, one for each direction of communication. In the illustrated example, the producing CPU 102 points to the first shared memory 104 while writing new data (e.g., for transfer to another CPU, such as first CPU 100), as the first, consuming CPU 100 is configured to read the data thereon during a data transfer operation.

Similarly, the first, consuming CPU 100 points to the second shared memory 106 while writing new data (e.g., for transfer to another CPU, such as second CPU 102), while the second, producing CPU 102 is configured to read data transferred from the first CPU 100.

As shown in FIG. 2, each shared memory includes separate regions, such that a CPU can access a given region of the shared memory, while another CPU can access another region of the shared memory (and/or opposing CPUs can access a common region at different times). Here, first shared memory 104 includes first region 108 and a second region 110, and second shared memory 106 includes third region 112 and a fourth region 114.

In some examples, the second CPU is configured to write to the first region 108 from write frames W Frame 0 to W Frame 3 and W Frame 8 to W Frame 11. The first region 108 is read by Read Frame 1 and Read Frame n of the first CPU. The second CPU is also configured to write to the second region 110 from write frames W Frame 4 to W Frame 7, which is read by Read Frame 0 and Read Frame 2 of the first CPU.

In some examples, the first CPU is configured to write to the third region 112 from Write Frame 0 and Write Frame 2 and read by R Frame 4 to R Frame 7 and R Frame n to R Frame (n+3) of the second CPU. The first CPU is also configured to write to the second region 110 from write frames W Frame 4 to W Frame 7 and read by R Frame 0 to R Frame 3 and R Frame 8 to R Frame 11 of the second CPU.

This arrangement allows for communication between cores yet avoids memory address collisions, all while maintaining data coherency. This is assured as the first and second CPUs are configured to read and/or write out of separate regions (e.g., regions 108-114) of the first and second shared memory 104 and 106.

An example data transfer operation is provided below, with reference to the system illustrated in FIG. 2. In some examples, prior to a data transfer operation, frames 120a-120n of the first CPU 100 will align with frames 122a-122n of the second CPU 102. For example, each frame 120 of the first CPU 100 will be aligned with multiple corresponding frames of the second CPU 102. As the frames 120a-120n operate at a slower rate (e.g., 5 kHz) than frames 122a-122n (e.g., 20 kHz), a 4:1 frame ratio results. Once so aligned, the producing CPU (e.g., first CPU 100) verifies that a desired buffer location (e.g., an IPC register within the one or more of regions 108-114) for new data is not in use by the consuming CPU (e.g., second CPU 102) or other CPU core. This can be accomplished by checking for a "new data" flag at the selected buffer location. When the producing CPU receives a response that the buffer location (e.g., IPC register) has been cleared by the consuming CPU, the producing CPU can initiate a data write operation as disclosed herein.

When the data write from the producing CPU to the shared memory is complete, the producing CPU then initiates a "new data" flag associated with the newly written buffer/region into the IPC registers to notify the consuming CPU that new data is available. The consuming CPU can then proceed to access the new data, without colliding with the producing CPU. When the producing CPU has additional new data for transfer to the consuming CPU, the producing CPU will access another buffer for writing the new data.

Similarly, if the producing CPU has not set a "new data" flag for the expected buffer by the start of each cycle, this is indicative of an error condition, as the consuming CPU expects a flag at the start of each cycle.

Figure 3:
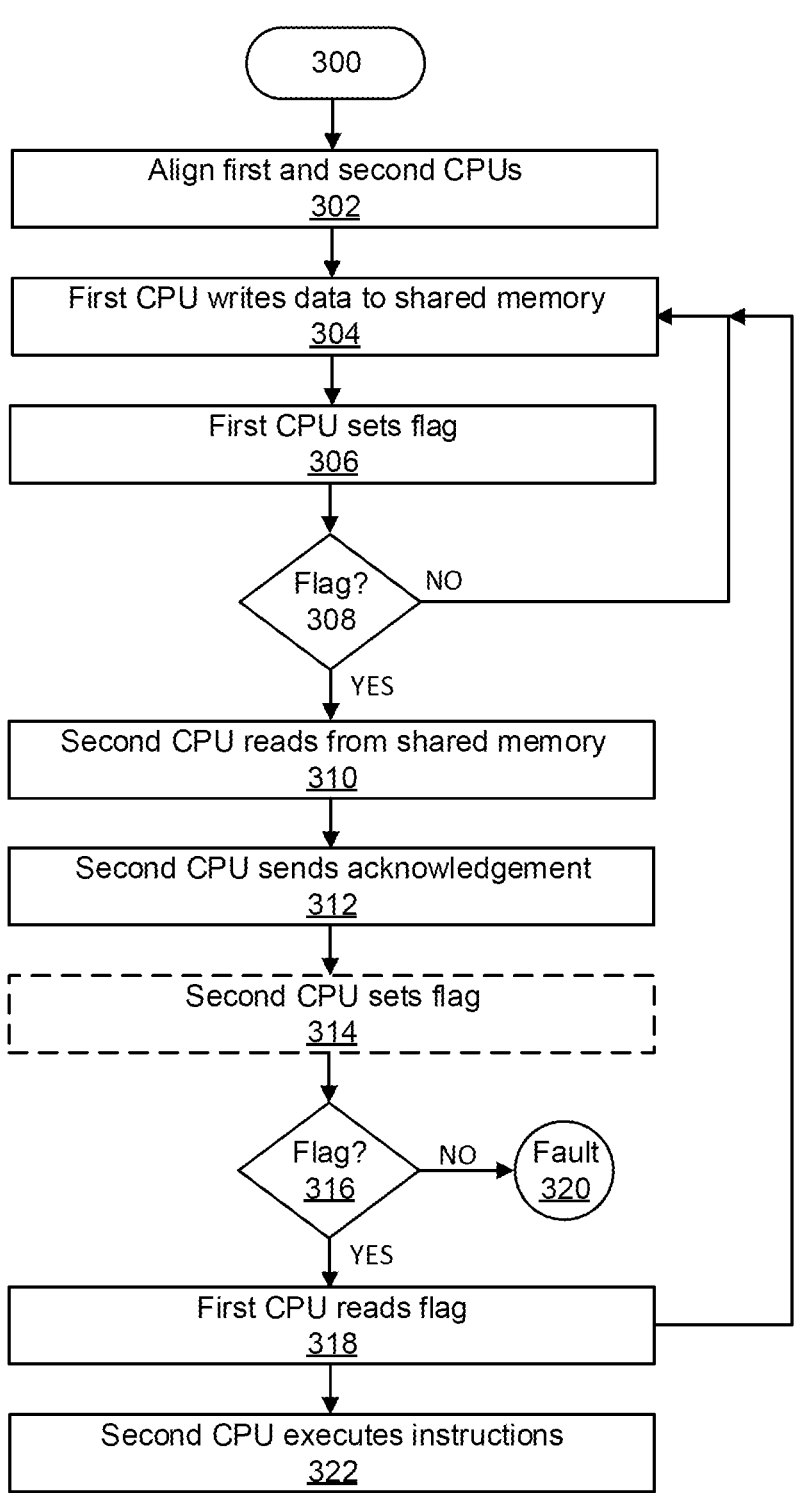
FIG. 3 illustrates an example method for a data transfer operation, in accordance with an example embodiment of the disclosure.

FIG. 3 is a logical representation of a data transfer operation 300 between the first CPU 100 (e.g., a producing CPU) and the second CPU 102 (e.g., a consuming CPU). The method can represent logic or instructions, executable by a DSP or other processing system, in accordance with this disclosure.

At block 302, a first CPU 100 (e.g., a producing CPU) is aligned with a second CPU second CPU 102 (e.g., a consuming CPU). This alignment can include correlating a beginning and an end time of a producing minor frame 120*a-n* of the first CPU with one or more frames 122*a-n* of the second CPU. In some examples, the second CPU includes four frames for each producing minor frame, such that the ratio between the producing minor frame of the first CPU to the four frames of the second CPU is 1:4. For a cycle of 200 us (e.g., a producing minor frame runs for 200 us), each consuming minor frame would have a length of 50 us. In this example, a write operation from the first CPU can transfer data to the shared memory during one complete minor producing frame, and the second CPU can receive the data from the shared memory during a second complete minor producing frame.

In some examples, a number of IPC frames of the shared memory correlate to the number of consuming minor frames. Further, a major producing frame can include multiple minor producing frames (e.g., five (5) in one second).

At block 304, the first CPU 100 (e.g., a producing CPU) writes new data to a shared memory. For instance, the first CPU can process an initial data transfer operation, such as at activation of the system. At block 306, a flag is set by the first CPU. In examples, the flag can include an address of where the new data is stored in the shared memory, timing information, or other relevant information. At block 308, the second CPU 102 queries the shared memory for a flag from the first CPU 100. If a flag is not present and/or no new data is hosted on the shared memory at the beginning of each minor frame, the method returns to block 304 and continues to query the shared memory.

In some examples, as the first CPU 100 operates at a slower rate, the second CPU 200 may not expect a flag (or other indication) from first CPU 100 at each cycle. Thus, the system may be programmed to expect an error at each instance where the minor frame of first CPU 100 does not receive a flag. However, the system may be programmed to allow one or more read operations from the read frames of the second CPU 200 to return without a flag (or other indication). In some the examples provided in this disclosure, the second CPU 200 operates at four times the frequency of the first CPU 100, therefore the system may accept that three operations from the second CPU 200 do not read a flag (or other indication).

If a flag is present, however, the second CPU reads the new data from the desired memory location at block 310. When the data is no longer being used within each 200 us time slot, in block 312 the second CPU can send an acknowledgement (e.g., ACK signal) to the first CPU, clearing the "new data" flag associated with the first buffers/regions in the IPC registers indicating the new data has been received. Here, transmission of the acknowledgement to the shared memory marks the end of the first minor producing frame. In an optional example, shown in block 314, the second CPU generates and writes a flag to the shared memory. This action prepares for receipt of additional new data in a second buffer, which will be ready at the start of a subsequent cycle (e.g., 200 us mark).

In block 316, at the beginning of a next (e.g., second) minor producing frame 120, the first CPU queries the shared memory for presence of a flag. In response to the presence of a flag from the second CPU, the first CPU changes the pointer to a memory address supplied via the flag in block 318 to read the information from the flag. For example, the second CPU may submit a confirmation that the instructions were received and/or executed, while writing the flag to a different address at the same shared memory (e.g., shared memory 106) and/or shared memory region (e.g., regions 112 and 114) as the first CPU. Thus, the pointer will identify an address on another shared memory (e.g., shared memory 104) and/or shared memory region (e.g., regions 108 and 110).

Once the first CPU reads the flag in block 318, the next/second minor producing frame 120 can continue with a new cycle, substantially as describe with regard to blocks 302 to 320. This can occur if block 304 is being performed as part of a continuous/cyclical operation, rather than an initial data transfer operation.

In an example, no flag is identified at the block 316, and the first CPU generates a fault signal at block 320. In some examples, a fault (and/or fault signal) causes the system to cease further operations. This can include preventing additional read/write operations between the CPUs, and/or preventing transmission of data and/or execution of instructions to or from the CPUs. Addressing the fault and/or resetting the flag may require corrective action from a control system and/or a user.

In additional or alternative examples, a fault (and/or fault signal) is registered, generates an alert and/or communication to related system, etc., yet continues operation. For instance, even if an expected flag is absent, and a fault is registered, read and/or write operations of one or both of the first and second CPUs may continue. This can include receiving new data, writing and/or reading of the new data to the shared memory, and/or execution of any instructions (e.g., received at the consuming CPU).

Further, at block 322, the second CPU can execute the instructions corresponding to the new data received in block 310. For example, the instructions may include commands to operate or move an actuator, a motor, and/or other control of another system (e.g., associated with a vehicle, such as an aircraft).

Although illustrated as occurring after submission of acknowledgement (in block 314 etc.) and/or submission of another flag, the second CPU may execute the instructions at any time after the read operation, including prior to generation and/or writing of an acknowledgement or flag.

If, however, a flag is not present and the shared memory (e.g., a region of the shared memory) is not in use, the method proceeds to block 310 where the first CPU 100 points to an accessible buffer and writes new data for transfer to the shared memory in block 312.

With reference to the several figures, multiple advantages are achieved through the innovative systems and methods disclosed herein.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A digital signal processor (DSP) for an electronic controller, comprising:
a first central processing unit (CPU) core;
a second CPU core aligned with a cycle of the first CPU core; and
a shared memory accessible to both the first CPU core and the second CPU core, wherein the first CPU core is configured to:
write data to a first portion of the shared memory; and
write a first flag to the shared memory;
wherein the second CPU is configured to:
query the first portion of the shared memory for the first flag; and
in response to confirmation the first flag is present at the shared memory, read the data from the first portion of the shared memory,
wherein the first CPU core includes a major frame having two or more minor frames, and the second CPU core includes a plurality of consuming frames, the first CPU core to query the shared memory at a start or an end of a minor frame of the two or more minor frames, and
wherein the minor frame operates at a first frequency and the plurality of consuming frames operate at a second frequency that is greater than the first frequency.

2. The system of claim 1, wherein the second frequency is four times greater than the first frequency.

3. The system of claim 1, wherein in response to confirmation the first flag is not present at the shared memory, the second CPU core registers a fault.

4. The system of claim 1, wherein the second CPU is configured to write a second flag to a second portion of the shared memory following the read of the data in the first portion of the shared memory, wherein in response to confirmation the second flag is not present at the shared memory, the second CPU core registers a fault.

5. The system of claim 4, wherein the first CPU is configured to query the second portion of the shared memory for the second flag, and in response to confirmation the second flag is not present at the shared memory, the first CPU core registers a fault.

6. The system of claim 1, wherein the first flag provides an address on the shared memory for the data.

7. The system of claim 6, wherein the shared memory includes one or more regions, the one or more regions includes one or more inter-processor communications (IPC)

registers, the address of the data on the shared memory identifying an IPC register of the one or more IPC registers storing the data.

8. A method for digital signal processing for an electronic control comprising:
aligning timing of a first CPU core and a second CPU core, wherein the aligning of the timing includes aligning a minor frame of the first CPU core to a plurality of consuming frames of the second CPU core, the minor frame operating at a first frequency and the plurality of consuming frames operating at a second frequency that is greater than the first frequency;
writing data from the first CPU core to a shared memory;
writing a first flag to the shared memory;
querying, by the second CPU core, the shared memory for the first flag;
confirming the first flag is present at the shared memory; and
reading the data from the shared memory.

9. The method of claim 8, wherein each of the first CPU core and the second CPU core include one or more write frames and one or more read frames.

10. The method of claim 8, wherein the first frequency of the minor frame operates at a 20 kHz frequency and the second frequency of the plurality of consuming frames operate at a 5 kHz frequency.

11. The method of claim 8, further comprising writing, by the second CPU, a second flag to the shared memory after completing the read of the data from the shared memory.

12. The method of claim 8, further comprising activating, by the second CPU, a controller of a vehicle including one of an aircraft, a wheeled vehicle, a maritime vehicle, or a rail vehicle in accordance with the data from the shared memory.

13. The method of claim 12, wherein the controller is a motor controller configured to activate one of a torque motor, a solenoid, or an actuator.

14. A method for digital signal processing for an electronic control comprising:
aligning timing of a minor frame of a first CPU core to one or more consuming frames of a second CPU core, wherein the minor frame operates at a 20 KHz frequency and the one or more consuming frames operate at a 5 kHz frequency;
writing data from the first CPU core to a shared memory;
transmitting, from the first CPU core, a first flag to the second CPU core, the first flag including an address storing the data in the shared memory;
receiving, at the second CPU core, the first flag;
accessing, by the second CPU core, the data at the address in the shared memory; and
reading the data by the second CPU core.

15. The method of claim 14, further comprising transmitting, by the second CPU, a second flag to the first CPU core confirming receipt of the data from the shared memory.

\* \* \* \* \*